United States Patent
Schmelzer

(10) Patent No.: US 12,480,632 B2
(45) Date of Patent: Nov. 25, 2025

(54) REFLECTOR ELEMENT FOR A MOTOR VEHICLE ILLUMINATION DEVICE

(71) Applicant: HELLA GmbH & Co. KGaA, Lippstadt (DE)

(72) Inventor: Sebastian Schmelzer, Soest (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 327 days.

(21) Appl. No.: 18/218,392

(22) Filed: Jul. 5, 2023

(65) Prior Publication Data

US 2023/0349529 A1 Nov. 2, 2023

Related U.S. Application Data

(63) Continuation of application No. PCT/EP2021/085467, filed on Dec. 13, 2021.

(30) Foreign Application Priority Data

Jan. 6, 2021 (DE) ............ 10 2021 100 093.9

(51) Int. Cl.
*F21S 41/37* (2018.01)

(52) U.S. Cl.
CPC ................ *F21S 41/37* (2018.01)

(58) Field of Classification Search
None
See application file for complete search history.

(56) References Cited

U.S. PATENT DOCUMENTS

| 4,210,841 | A | * | 7/1980 | Vodicka | H01K 1/28 362/267 |
|---|---|---|---|---|---|
| 8,993,119 | B2 | | 3/2015 | Koch et al. | |
| 10,840,413 | B2 | | 11/2020 | Reeswinkel et al. | |
| 2002/0154407 | A1 | * | 10/2002 | Frazier | F21V 7/28 359/507 |
| 2004/0233530 | A1 | * | 11/2004 | Kramer | G02B 1/14 359/507 |
| 2010/0075172 | A1 | * | 3/2010 | Koch | C23C 14/024 204/192.12 |

(Continued)

FOREIGN PATENT DOCUMENTS

| DE | 102015102870 A1 | 9/2016 |
|---|---|---|
| DE | 102016115921 A1 | 3/2018 |

(Continued)

OTHER PUBLICATIONS

Schmauder—WO 2008-104389 A2—MT—layers for wipe-resistant reflector—2008 (Year: 2008).*

(Continued)

*Primary Examiner* — John Vincent Lawler
(74) *Attorney, Agent, or Firm* — Muncy, Geissler, Olds & Lowe, P.C.

(57) ABSTRACT

A reflector element for a motor vehicle illumination device having a main body, a mirror layer disposed over the main body and comprising aluminum or silver, a protective layer disposed over the mirror layer and comprising siloxane, and a capping layer disposed over the protective layer and comprising a transition metal oxide. The protective layer and the capping layer each having a layer thickness of 10 nm to 100 nm.

12 Claims, 3 Drawing Sheets

(56) References Cited

U.S. PATENT DOCUMENTS

| | | | | |
|---|---|---|---|---|
| 2014/0329071 A1* | 11/2014 | Meyer | ............... | C08G 64/14 |
| | | | | 428/323 |
| 2015/0353773 A1* | 12/2015 | Dornseif | ............ | C23C 22/74 |
| | | | | 204/192.15 |
| 2018/0045864 A1* | 2/2018 | Schürmann | ......... | G02B 5/0808 |
| 2019/0285775 A1* | 9/2019 | Zieba | ............. | C03C 17/3417 |

FOREIGN PATENT DOCUMENTS

| | | | | |
|---|---|---|---|---|
| EP | 2270392 A1 * | 1/2011 | ............ | G02B 1/14 |
| EP | 2752504 A1 | 7/2014 | | |
| WO | WO2007121898 A1 | 11/2007 | | |
| WO | WO-2008104389 A2 * | 9/2008 | ............ | G02B 1/18 |
| WO | WO-2010112122 A1 * | 10/2010 | ......... | C23C 18/1225 |

OTHER PUBLICATIONS

Gillich —WO 2010-112122 A1—PCT D3—MT—reflector—top layer too thick—2010 (Year: 2010).*
Blessing—EP 2270392 A1—PCT D4—MT—coating for reflector—silicon oxide not transition—2011 (Year: 2011).*
International Search Report dated Apr. 14, 2022 in corresponding application PCT/EP2021/085467.

* cited by examiner

REFLECTOR ELEMENT FOR A MOTOR VEHICLE ILLUMINATION DEVICE

This nonprovisional application is a continuation of International Application No. PCT/EP2021/085467, which was filed on Dec. 13, 2021, and which claims priority to German Patent Application No. 10 2021 100 093.9, which was filed in Germany on Jan. 6, 2021, and which are both herein incorporated by reference.

BACKGROUND OF THE INVENTION

Field of the Invention

The present invention relates to a reflector element for a motor vehicle illumination device and a method for producing the same.

Description of the Background Art

Reflector elements for motor vehicle illumination devices comprise a main body, typically made of a plastic, on which a thin mirror layer of aluminum has been deposited. To protect against corrosion, a transparent protective layer, which usually is formed a plasma polymer, is usually disposed over the mirror layer. Such reflector elements have reflectances of about 85% in the visible light spectrum.

In order to realize a higher luminous efficacy, for example, for motor vehicle illumination devices with multiple reflector designs, it is known to arrange dichroic auxiliary layers on the mirror layer, which lead to an increase in the reflectance due to interference effects. The commonly used dichroic auxiliary layers disadvantageously lack a corrosion protection effect and, in addition, the usually required high layer thicknesses necessitate long deposition times, which can be accompanied by undesirably strong heating of the main body, which can result in damage or at least discoloration of the same.

As an alternative to protective layers of aluminum, silver coatings are known in the prior art, which are characterized by a higher reflectance in the visible light spectrum. Disadvantageously, the corrosion resistance of silver coatings is particularly low, especially in the presence of sulfur compounds. Therefore, in the prior art, protective layers with a great layer thickness are used, which worsens the reflective properties of the reflector element. In particular, the reflectance of silver drops sharply in the blue region, so that mirror coatings of silver per se have a yellowish appearance, which is further intensified by a thick protective layer.

DE 10 2015 102 870 A1, which corresponds to US 2018/0045864, discloses a reflector element comprising a plastic substrate, a silver layer, a first barrier layer disposed over the silver layer and comprising an oxide layer at least 15 nm thick, and a second barrier layer, comprising a siloxane and disposed over the first barrier layer, wherein the thickness of the second barrier layer is at least 250 nm and at most 450 nm. The use of a second barrier layer several 100 nm thick requires disadvantageously long process times in the production of such a reflector element. In addition, the angular dependence of the reflectance is undesirably increased by the presence of such a thick single layer.

SUMMARY OF THE INVENTION

It is therefore an object of the present invention to provide a reflector element for a motor vehicle illumination device which overcomes the aforementioned disadvantages of reflector elements from the prior art and has a high reflectance in the entire visible light spectrum while at the same time being highly resistant to corrosion.

In an exemplary embodiment, the reflector element comprises at least: a main body, a mirror layer disposed over the main body and comprising aluminum or silver, a protective layer disposed over the mirror layer and comprising siloxane, and a capping layer disposed over the protective layer and comprising a transition metal oxide, wherein the protective layer and the capping layer each have a layer thickness of 10 nanometers to 100 nanometers.

The invention is based on the idea of compensating for the deterioration of the reflective properties caused by the protective layer of an organosilicon compound, said protective layer necessary for corrosion protection, by applying a capping layer of a transition metal oxide over it, said capping layer acting as an optical amplifier layer. Surprisingly, and in contrast to layer structures known from the prior art, it is sufficient according to the invention to make the individual layers of the protective layer and capping layer thinner than 100 nm. The reflector element according to the invention thus exhibits corrosion resistance and long-term resistance sufficient for practical use, and with regard to the functional optical properties, it is characterized by an increase in its reflectance compared to a pure metal coating, with a concurrent optimization of the color neutrality of the appearance. Thanks to the thin layer thicknesses of the invention, only extremely short deposition times are required in the production of the reflector element of the invention, so that the heat input, occurring thereby, into the normally heat-sensitive main body can be kept to a minimum.

The capping layer can have a binary transition metal oxide with a high refractive index in the visible light spectrum, in particular with a refractive index greater than 2. Suitable transition metal oxides are, for example, titanium dioxide or zirconium dioxide. Due to the high refractive index, the layer thickness of the capping layer can be formed thin, i.e., in particular thinner than 100 nm, with a sufficient optical amplification effect with respect to the reflectance of the reflector element of the invention.

For example, the mirror layer has aluminum, and the capping layer has titanium dioxide, wherein the protective layer has a layer thickness of 70 nm to 80 nm, preferably 75 nm, and the capping layer has a layer thickness of 50 nm to 60 nm, preferably 55 nm. In a further exemplary embodiment, the mirror layer has silver, and the capping layer has titanium dioxide, wherein the protective layer has a layer thickness of 45 nm to 55 nm, preferably 50 nm, and the capping layer has a layer thickness of 45 nm to 55 nm, preferably 50 nm. The excellent reflective properties of these exemplary embodiments are described in more detail below in connection with the figures.

Preferably, the reflector element of the invention can have a color-neutral appearance, wherein white light reflected by the reflector element in the normal direction is characterized in the CIELAB color space by color coordinates which have a value smaller than 2, preferably zero. The CIELAB color space is standardized in EN ISO 11664-4. The three-dimensional CIELAB color space is spanned by a color plane spanned by the color coordinates a* and b* and a lightness value L* perpendicular to it. Absolute color neutrality exists if both color coordinates a* and b* are identical to zero. In particular, the reflector element of the invention is designed such that the intrinsic yellow tint in the white light reflection from pure silver is compensated by a coordinated combination of the protective and capping layer.

With further advantage, the reflector element of the invention has a maximum reflectance of 95% to 99% in the visible light spectrum. In addition to improving color neutrality, the effect of the layer stack applied according to the invention thus includes in particular in that the reflectance of the reflector element of the invention is significantly increased compared to a pure metal mirror layer.

For example, the main body of the reflector element of the invention can be formed from a plastic and can have in particular a polycarbonate, a polyetherimide, or, for example, a base-coated bulk molding compound. In terms of their thermo-mechanical properties, their processability, and economic aspects, these materials are suitable for use in reflector elements of motor vehicle illumination devices.

In addition, the reflector element of the invention can have, for example, an optional intermediate layer with a layer thickness of, for example, less than 50 nm, which is disposed between the main body and the mirror layer. Depending on the material used for the main body, this intermediate layer serves as a bonding layer between the main body and the mirror layer and/or as a diffusion barrier for protecting the mirror layer from substances escaping from the main body, such as, for example, water or oxygen.

The invention further relates to a method for producing a reflector element for a motor vehicle illumination device according to one of the aforementioned embodiments, wherein the mirror layer and the capping layer are each deposited by sputtering, also called cathode sputtering, and the protective layer is deposited by plasma-enhanced chemical vapor deposition. The protective layer is preferably formed by plasma polymerization of hexamethyldisiloxane (HMDSO). Preferably, the mirror layer is deposited by means of direct current sputtering and the capping layer by means of alternating current sputtering, preferably medium-frequency sputtering at frequencies in the range of, for example, 20 kHz to 70 kHz.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
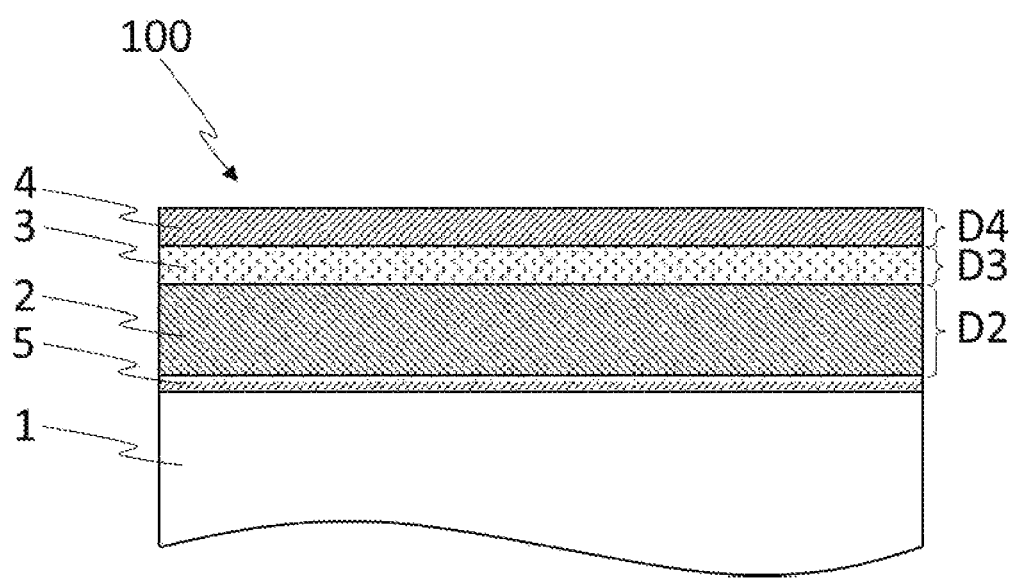
FIG. 1 shows a schematic cross-sectional partial view of a reflector element of the invention.

FIG. 1 shows a schematic cross-sectional view of a section of a reflector element 100 of the invention, which comprises main body 1 with the thin-layer stack, applied thereon, of functional layers 2-5. Main body 1 is preferably made of a plastic.

Mirror layer 2 can be formed in particular of silver, which is characterized by a higher reflectance in the visible light spectrum than aluminum, which is more common in the prior art. Depending on the topography of the substrate, i.e., the surface of main body 1 and intermediate layer 5, as well as the deposition conditions, the layer thickness D2 of mirror layer 2 is preferably selected so that its surface has the lowest possible roughness, i.e., the highest mirror effect. The layer thickness D2 here is typically 50 nm to 150 nm.

The optional intermediate layer 5 deposited on the main body prior to deposition of mirror layer 2 includes, for example, of an HMDSO-based plasma polymer or of sputtered titanium. Depending on the material and surface properties of main body 1, intermediate layer 5 can act as an adhesion promoter for mirror layer 2 and/or represent a diffusion barrier for species escaping from main body 1, e.g., water molecules or oxygen, which could cause damage to mirror layer 2.

Protective layer 3, deposited in particular by means of plasma polymerization of HMDSO and serving to protect against corrosion, is disposed over mirror layer 2. According to the invention, the thickness D3 of protective layer 3 is less than 100 nm. Capping layer 4 deposited on protective layer 3 formed of a highly refractive material, preferably a binary transition metal oxide with a refractive index greater than 2 in the range of the visible light spectrum, and according to the invention also has a thin layer thickness D4 of less than 100 nm.

Figure 2A:
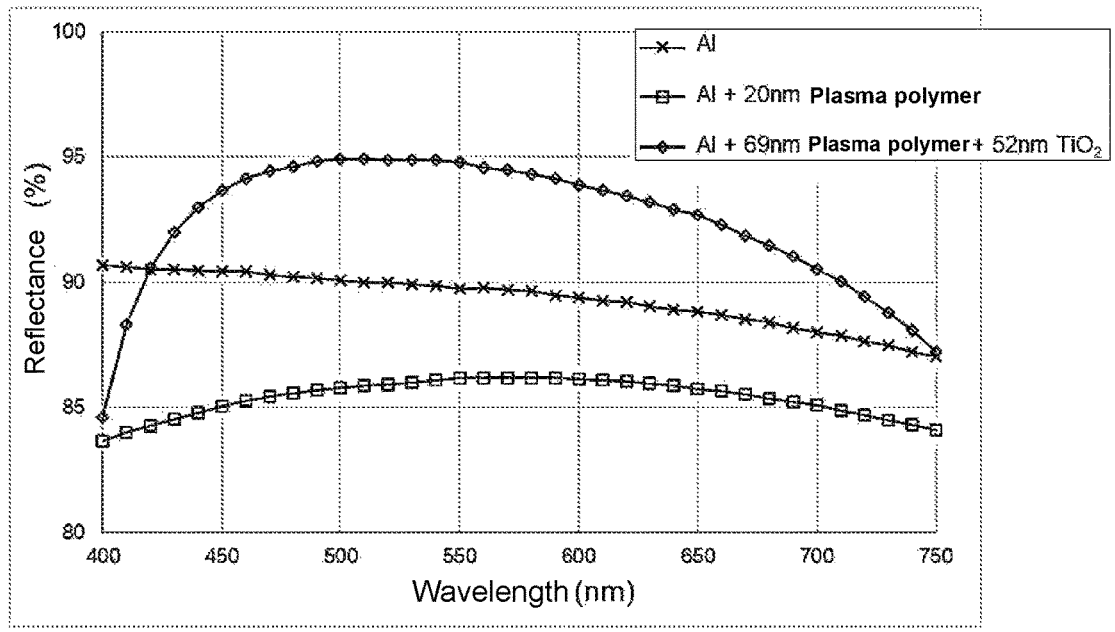
FIG. 2a shows the spectral reflectance of Al-based layer stacks.
Figure 2B:
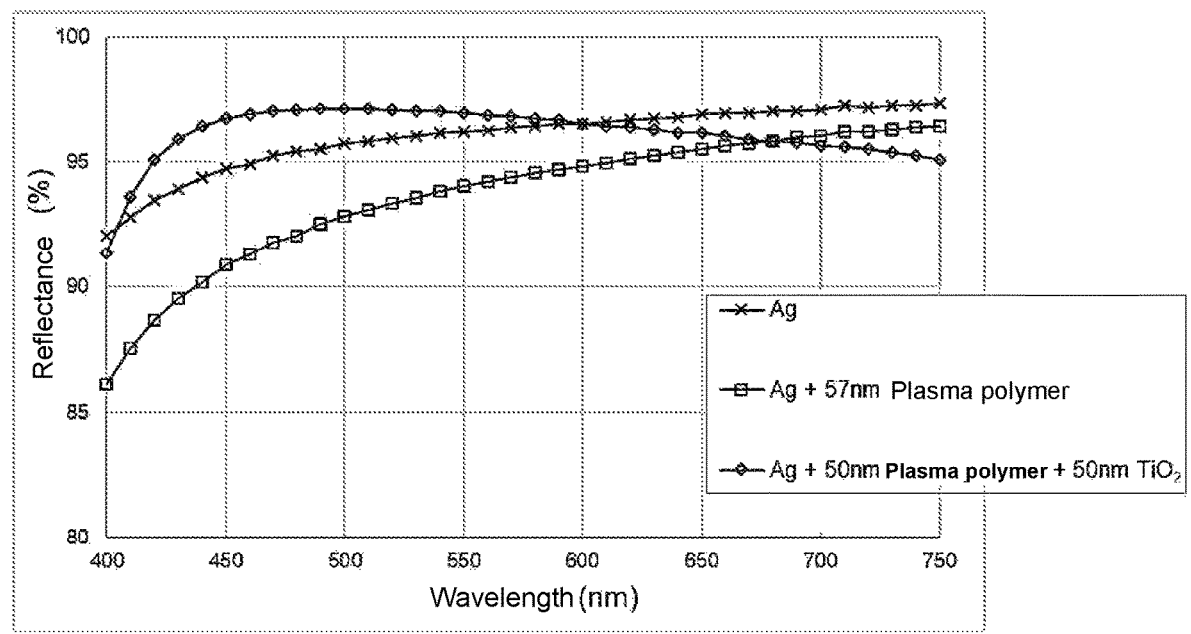
FIG. 2b shows the spectral reflectance of Ag-based layer stacks.

FIG. 2a and FIG. 2b show the experimentally determined spectral reflectance in the visible light spectrum, i.e., at light wavelengths between 400 nm and 750 nm, of aluminum- and silver-based layer stacks, respectively, in each case in comparison of a pure mirror layer (Al and Ag), a mirror layer with a protective layer of siloxane plasma polymer, and a mirror layer with a protective layer of siloxane plasma polymer and a capping layer of titanium dioxide ($TiO_2$). The thicknesses of the individual layers are in each case indicated in the legends of the figures and are less than 100 nm in each case, as provided for according to the invention.

The comparison of the pure metal layers reveals the higher intrinsic reflectance of silver compared to aluminum. With the exception of wavelengths in the blue region below 450 nm, the pure mirror layer of silver exhibits a reflectance of more than 95%, which demonstrates the particular suitability of silver for use in reflector elements. The decrease in reflectance in the blue region leads to a yellow tint in the appearance of the silver layer. The effect of the protective layer is a reduction of the reflectance over the entire spectral range represented, especially in the blue range, which, in combination with silver, further disadvantageously intensifies its yellow tint in appearance. The layer stacks with a final capping layer of titanium dioxide are characterized by a significant increase in reflectance, which justifies the designation as an optical amplifier layer. Despite the presence of the protective layer of plasma polymer, an average reflectance in the visible light spectrum of over 95% results in the case of the silver-based layer stack. In this case, the presence of the capping layer also advantageously results in a certain redistribution of the spectral weight from red to blue, which results in a correction of the yellowish appearance, so that a reflector element of the invention with such a layer stack has a color-neutral appearance, in which white light reflected in the normal direction is characterized in the CIELAB color space by color coordinates less than 2 in terms of values.

Figure 3A:
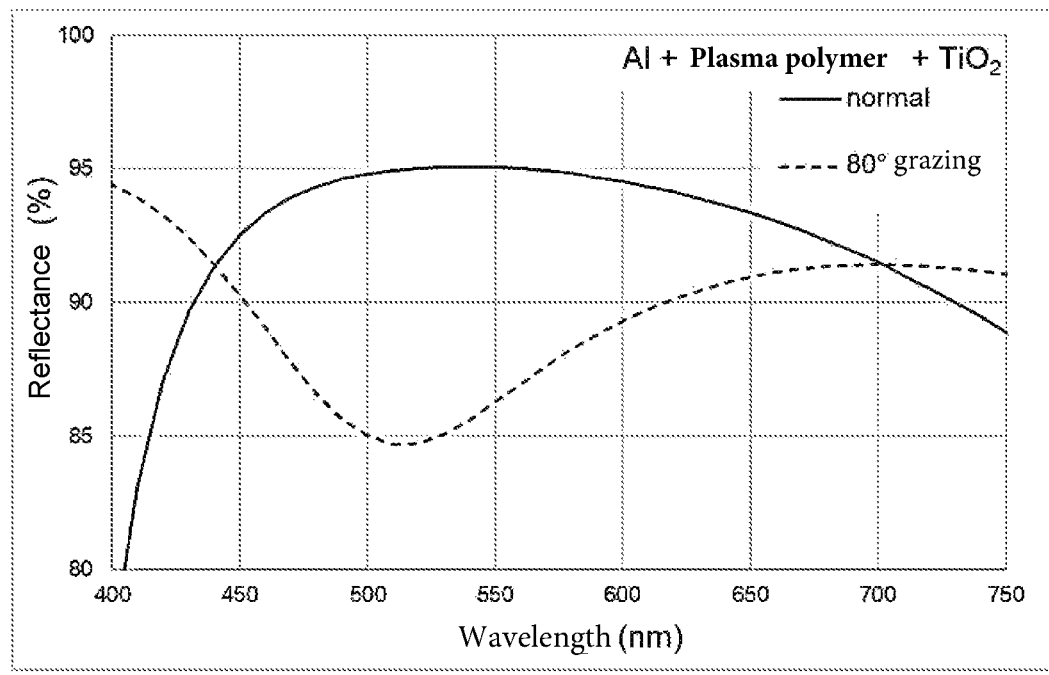
FIG. 3a shows the spectral angle-dependent reflectance of an Al-based layer stack.
Figure 3B:
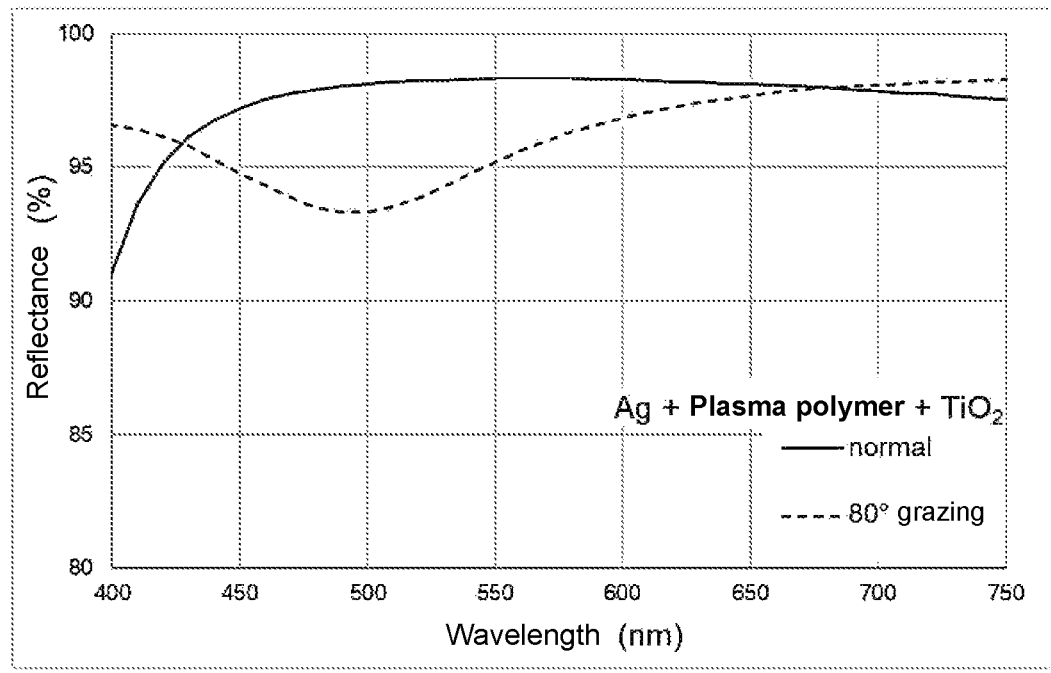
FIG. 3b shows the spectral angle-dependent reflectance of an Ag-based layer stack.

FIG. 3a and FIG. 3b show, on the basis of simulations, the spectral angle-dependent reflectance in the visible light spectrum of aluminum-plasma polymer-titanium dioxide and silver-plasma polymer-titanium dioxide layer stacks, respectively, whose individual layer thicknesses each lie in the range between 10 nm and 100 nm as provided for according to the invention. The reflectance is shown for light incident in the normal direction, i.e., perpendicular at an angle of 0° to the (local) surface, and for the grazing incidence of light at an angle of 80°. For both layer stacks, the reflectance for the grazing incidence is characterized by a minimum at a light wavelength around 500 nm, which corresponds to a change in the color appearance compared to the normal incidence when illuminated with white light. It should be emphasized, however, that the average reflectance at the flat viewing angle of 80° is only insignificantly lower than in the normal direction. This represents a further advantage of reflector elements of the invention with layer thicknesses of less than 100 nm, because in contrast, reflector elements, known from the prior art, with plasma polymer protective layers of higher layer thickness, in particular greater than 250 nm, have a much greater drop in reflectance at flat viewing angles. The comparison of FIGS. 3a and 3b also shows the advantages of silver-based versus aluminum-based layer stacks with respect to the angular dependence of the reflectance. This is due to an intrinsically lower dependence of the reflectivity of silver on the polarization of the incident light.

The invention is not limited in its implementation to the preferred exemplary embodiment described above. Rather, a number of variants are conceivable which make use of the shown solution even in the case of fundamentally different embodiments. All features and/or advantages emerging from the claims, the description, or the drawings, including structural details, spatial arrangements, and process steps, can be essential to the invention both alone and in the most diverse combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A reflector element for a motor vehicle illumination device, the reflector element comprising:
    a main body;
    a mirror layer disposed over the main body and comprising aluminum or silver;
    a protective layer disposed over the mirror layer and comprising siloxane; and
    a capping layer disposed over the protective layer and comprising a transition metal oxide,
    wherein the protective layer and the capping layer each have a layer thickness of about 10 nm to 100 nm.

2. The reflector element according to claim 1, wherein the capping layer has a binary transition metal oxide with a high refractive index in the visible light spectrum with a refractive index greater than 2.

3. The reflector element according to claim 1, wherein the mirror layer has aluminum and the capping layer has titanium dioxide, wherein the protective layer has a layer thickness of 70 nm to 80 nm or 75 nm, and the capping layer has a layer thickness of 50 nm to 60 nm or 55 nm.

4. The reflector element according to claim 1, wherein the mirror layer has silver and the capping layer has titanium dioxide, wherein the protective layer has a layer thickness of 45 nm to 55 nm or 50 nm, and the capping layer has a layer thickness of 45 nm to 55 nm or 50 nm.

5. The reflector element according to claim 1, wherein the reflector element has a color-neutral appearance, wherein white light reflected by the reflector element in the normal direction is in the CIELAB color space by color coordinates which have a value less than 2.

6. The reflector element according to claim 1, wherein the reflector element has a color-neutral appearance, wherein white light reflected by the reflector element in the normal direction is in the CIELAB color space by color coordinates which have a value that is zero.

7. The reflector element according to claim 1, wherein the reflector element has a maximum reflectance of 95% to 99% in the visible light spectrum.

8. The reflector element according to claim 1, wherein the main body is formed from a plastic and has a polycarbonate, a polyetherimide, or a bulk molding compound.

9. The reflector element according to claim 1, wherein the reflector element has an intermediate layer disposed between the main body and the mirror layer.

10. A method for producing a reflector element for a motor vehicle illumination device according to claim 1, the method comprising:
    depositing by sputtering the mirror layer and the capping layer; and
    depositing the protective layer by plasma-enhanced chemical vapor deposition.

11. The method according to claim 10, wherein the mirror layer is deposited by direct current sputtering and the capping layer by alternating current sputtering.

12. The method according to claim 10, wherein the mirror layer is deposited by direct current sputtering and the capping layer by medium-frequency sputtering.

* * * * *